US011338754B1

(12) United States Patent
Schmenk et al.

(10) Patent No.: US 11,338,754 B1
(45) Date of Patent: May 24, 2022

(54) EXTREME TEMPERATURE SAFETY DEVICE FOR VEHICLES

(71) Applicants: Mitchell Ethan Schmenk, Frisco, TX (US); Robert Seloff, Carrollton, TX (US)

(72) Inventors: Mitchell Ethan Schmenk, Frisco, TX (US); Robert Seloff, Carrollton, TX (US)

(73) Assignee: Mitchell Schmenk, Frisco, TX (US)

( * ) Notice: Subject to any disclaimer, the term of this patent is extended or adjusted under 35 U.S.C. 154(b) by 257 days.

(21) Appl. No.: 16/686,794

(22) Filed: Nov. 18, 2019

Related U.S. Application Data

(60) Provisional application No. 62/833,734, filed on Apr. 14, 2019.

(51) Int. Cl.
 B60R 21/015 (2006.01)
 G08B 21/22 (2006.01)
 G08B 21/02 (2006.01)
 B60H 1/00 (2006.01)
 G07C 9/00 (2020.01)

(52) U.S. Cl.
 CPC ... B60R 21/01534 (2014.10); B60H 1/00742 (2013.01); G07C 9/00896 (2013.01); G08B 21/0211 (2013.01); G08B 21/22 (2013.01)

(58) Field of Classification Search
 CPC .................. B60R 21/01534; B60R 21/015
 See application file for complete search history.

(56) References Cited

U.S. PATENT DOCUMENTS

| 5,949,340 | A | 9/1999 | Rossi |
| 9,381,857 | B1 | 7/2016 | Arnold |
| 9,701,243 | B1 | 7/2017 | Phatak |
| 9,895,955 | B2 | 2/2018 | Quaranta-Guido |
| 9,988,055 | B1 | 6/2018 | O'Flaherty |
| 10,102,729 | B1 | 10/2018 | Hill |
| 2016/0200276 | A1* | 7/2016 | Diewald ............... G01S 13/56 342/28 |

(Continued)

FOREIGN PATENT DOCUMENTS

CN 108944770 A * 12/2018

OTHER PUBLICATIONS

Cydney Henderson: Phoenix father creates app to prevent chidren from dying in hot cars; May 27, 2018: Azcentral.com.

(Continued)

Primary Examiner — Daniel J Colilla

(57) ABSTRACT

An improved vehicle safety device for activating an alarm when the temperature in the interior of a vehicle reaches an extreme value. The device includes a presence sensor for detecting the presence of a human or an animal in the interior of a vehicle and a temperature sensor for detecting the temperature in the vehicle interior. A controller is coupled to the presence detector, the temperature detector, and the vehicle ignition system for generating a hazardous-condition signal in response to an extreme-temperature condition in the vehicle when a human or an animal is in the vehicle and the vehicle engine is not running. An alarm module is connected to the controller for generating audible, visual, and wireless emergency-response signals when a hazardous condition is detected. The alarm module may also be further configured to create a door-unlocking signal.

5 Claims, 4 Drawing Sheets

(56) References Cited

U.S. PATENT DOCUMENTS

2020/0062080 A1* 2/2020 Hernandez .............. E05F 15/73
2020/0290567 A1* 9/2020 Funyak .................. B60R 25/31

OTHER PUBLICATIONS

Emily Thomas; Evenflo SensorSafe Car Seat Alerts Parents to Presence of Child Still in the Car; Sep. 21, 2016; consumerreports.org.

* cited by examiner

EXTREME TEMPERATURE SAFETY DEVICE FOR VEHICLES

CROSS-REFERENCE TO RELATED APPLICATION

The present application claims the benefit of U.S. Provisional Patent Application Ser. No. 62/833,734, filed Apr. 14, 2019.

FIELD OF INVENTION

The present invention relates to safety devices for vehicles and more particularly to safety devices for activating an alarm when the temperature in the interior of a vehicle reaches an extreme value.

BACKGROUND OF INVENTION

Every year, children and animals die from being trapped inside of a vehicle in extreme temperature conditions. Some phone applications or sensors, such as The Backseat App or the SensorSafe Car Seat Buckle by Evenflo, remind drivers to check their backseats for a child after completing their drive. However, after repeated use, drivers may become immune to the subtle notifications of these solutions. Additionally, these solutions only account for situations for which a child or animal is accidentally left inside of a vehicle, which does not cover all of the extreme temperature related deaths in vehicles. A significant portion of the extreme temperature related deaths in vehicles result from children being intentionally left in the vehicle or gaining access to the vehicle themselves, which the previously mentioned solutions cannot limit. Consequently, a need for a safety device with the capability to limit all types of extreme temperature related deaths in vehicles arises.

Current solutions to this issue lack the consistency and accuracy of the present invention. For example, U.S. Pat. No. 9,895,955 to Quaranta-Guido describes a heatstroke preventative device in which $CO_2$ sensors are used to detect presence inside of a vehicle by measuring the $CO_2$ concentration inside of the vehicle at certain locations. However, this data may be easily misconstrued if a window is opened or the vehicle's ventilation is otherwise changed.

Another problem that current devices have is their limited-alarm outputs. In the case of U.S. Pat. No. 9,381,857 to Arnold et al., the described device only sounds an audible alarm. While this may attract the attention of individuals nearby, it does nothing to notify police, medical, or fire-department personnel of an emergent situation. When nobody is in the vicinity to respond to a visual or audible alarm, notification of police, medical, or fire-department authorities may be the only way to resolve the hazardous condition.

Hence, given the significant disadvantages of the currently available heatstroke preventive devices, there is a need for a more effective apparatus to prevent death or injury from extreme temperature conditions in vehicles.

SUMMARY OF INVENTION

The principles of the present invention are embodied in a vehicle safety device, which includes a presence sensor for detecting the presence of a human or an animal in the interior of a vehicle, a temperature sensor for detecting the temperature in the vehicle interior, a controller coupled to the presence detector, the temperature detector, and the vehicle ignition system for generating a hazardous-condition signal in response to an extreme temperature condition in the vehicle when a human or animal is in the vehicle and the vehicle engine is not running, and an alarm module connected to the controller for generating audible, visual, and wireless emergency-response signals when a hazardous condition is detected. The alarm module may also be further configured to generate a door-unlocking signal.

BRIEF DESCRIPTIONS OF DRAWINGS

For a more complete understanding of the present invention, and the advantages thereof, reference is now made to the following descriptions taken in conjunction with the accompanying drawings in which.

DETAILED DESCRIPTION OF THE INVENTION

The present invention is designed to reduce the number of deaths from extreme temperatures inside of vehicles by alerting surrounding individuals, the owner of the vehicle, and medical-emergency and law-enforcement authorities when there is a hazardous condition involving a child or animal inside of a dangerously hot or cold vehicle.

Figure 1:
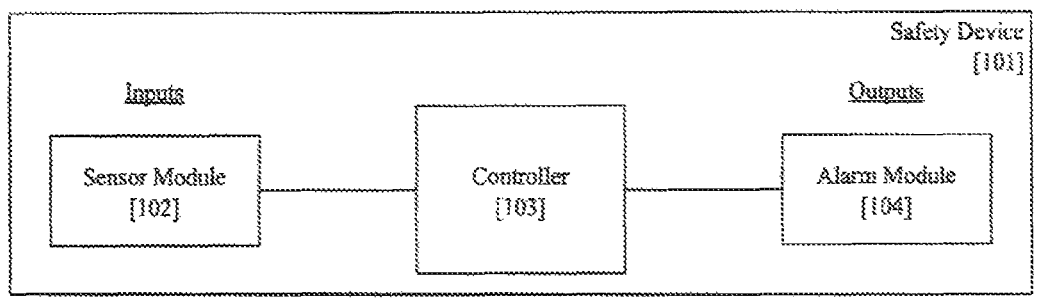
FIG. 1 is a block diagram of the major components of the present invention.

Referring to FIG. 1, the safety device 101 that is the present invention contains a sensor module 102, a controller 103, and an alarm module 104. The controller 103 accepts inputs from the sensor module 102 and, after processing those inputs, generates a hazardous-condition signal 105 indicative of a hazardous condition in the vehicle. Signal 105 is then further processed by the alarm module 104 which may provide a series of output signals 201, 202, 203, and 204 (FIG. 2).

Figure 2:
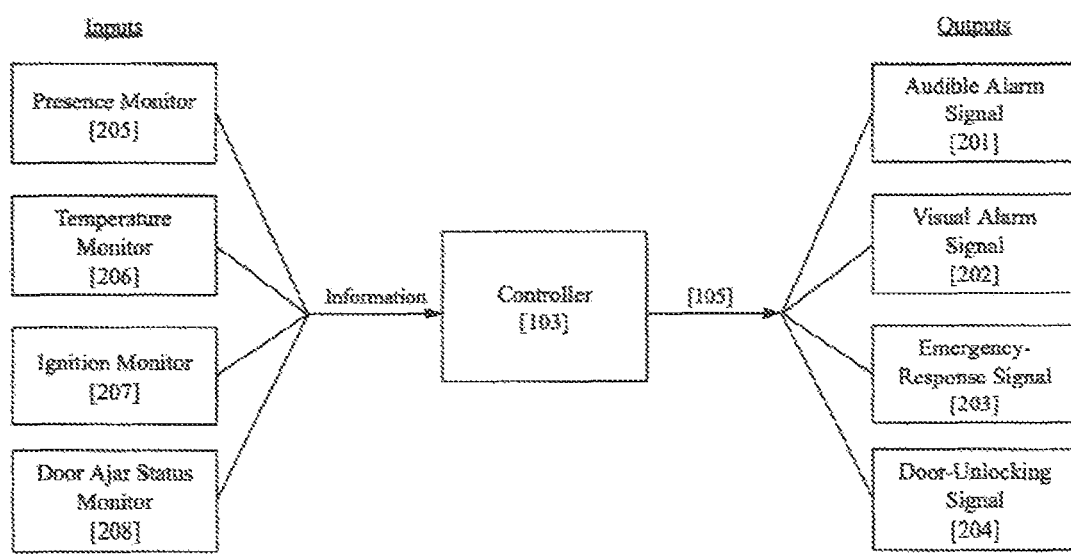
FIG. 2 is a block diagram showing the inputs and outputs of the sensor module, controller, and the alarm module respectively.

As shown in FIG. 2, the sensor module 102 may contain a presence monitor 205, a temperature monitor 206, an ignition monitor 207, and a door-ajar status monitor 208. The presence monitor 205 is preferably disposed in the interior of the vehicle and is designed to measure activity only within the interior of the vehicle. Any simple motion sensor could accomplish this role in the safety device. However, to provide more accurate readings, the presence monitor 205 should be able to detect heartbeats and respiration around or through barriers in the interior of the vehicle. A radar-based detection sensor with a frequency below 10 GHz, such as model X4M300 manufactured by XeTrhu, has proven suitable for this task. Although the radar-based detection sensor may be triggered by motion other than that of an animal or human, the controller 103 can be programmed to recognize only specific motion patterns such as breathing or a heartbeat.

The temperature monitor 206 provides information to the controller 103 indicative of the ambient temperature inside of the vehicle. The temperature monitor 206 may be any suitable temperature sensor for measuring the ambient temperature for extreme heat or cold, such as GM Part number 25775833, manufactured by General Motors Corporation. Alternatively, the temperature monitor 206 may be a bimetallic strip, a thermistor, or a thermocouple.

The ignition monitor 207 provides information to the controller 103 about the on-off status of the vehicle's ignition. Preferably, the sensor module 102 should be connected to the vehicle's CPU to access information about the state of the ignition. Alternatively, instead of hardwiring the sensor module 102 to the CPU, a zener diode or a voltage-monitoring device can be connected to a site in the vehicle that receives power regardless of the ignition state, such as a cabin light. When the ignition is turned on, the voltage will increase a measurable amount, allowing the zener diode or voltage-monitoring sensor to detect a voltage increase and provide information to the controller about ignition status.

The door-ajar status monitor 208 may also be provided to supply additional information to the controller 103 about the status of doors to prevent the triggering of false hazardous-condition signals caused by opening and closing vehicle doors. When a driver enters into an extremely hot or cold vehicle, for example, ample time needs to be given to start the ignition and to adjust the vehicle's ambient temperature to a normal level to avoid prematurely generating a false hazardous-condition signal. However, this allotted time should be no longer than 5 minutes as to avoid missing a hazardous condition. Additionally, any changes to the ajar-status of the vehicle's doors indicates activity with the vehicle. Accordingly, monitoring the opening and closing of the vehicle's doors provides the controller 103 with additional information by which signals indicative of a false hazardous condition may be filtered.

The controller's job is to define a hazardous condition when the information given by the sensor module 102 is indicative of a potentially harmful situation. These variables include: ignition turned off, extreme ambient temperature inside of the vehicle, presence inside the vehicle, and the lack of recent significant door-ajar status changes as described in FIG. 3. If the controller 103 interprets the outputs from the sensor module 102 to be a hazardous condition through the process described in FIGS. 2 and 3, it then sends a hazardous-condition signal 105 to the alarm module 104.

Referring to FIGS. 1 and 2, the alarm module 104 receives a hazardous-condition signal from the controller 103 when a hazardous condition is detected. The alarm module 104 generates four kinds of output signals: an audible alarm signal 201, a visual alarm signal 202, a wireless emergency-response signal 203, and a door-unlocking signal 204. Audible alarm signal 201 may be used, for example, to sound a car's horn or other audible alarm. Visual alarm signal 202 may be used to flash the headlights to draw attention of nearby individuals to the vehicle. Emergency-response signal 203 may be used to wirelessly transmit an emergency message to police, fire department, or emergency-trained medical personnel to notify them of a potential hazardous condition. Additionally, the emergency-response signal 203 contains information regarding the vehicle's location to aid responders in locating the vehicle. While it is preferred that people in the vicinity of the vehicle resolve the hazardous condition first, the threshold temperature may be set so that there is sufficient time for emergency personnel notified by signal 203 to respond and resolve the hazardous condition before it becomes deadly. Additionally, the controller may also generate a door-unlocking signal 204, which will unlock the vehicle doors in an emergency situation, thereby eliminating the need to break the vehicle's windows or pry open its doors.

Figure 3:
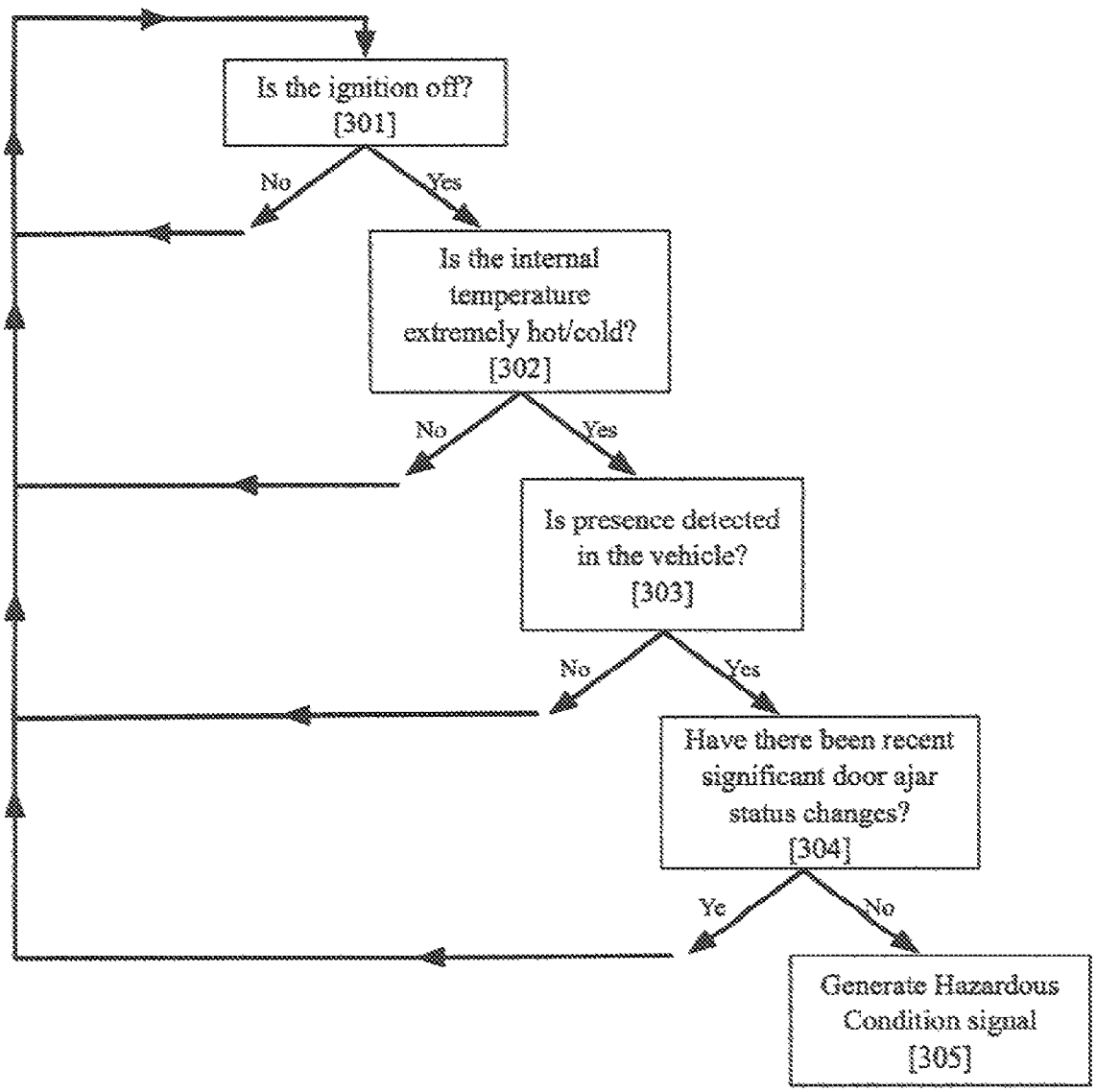
FIG. 3 is a flow diagram of the process carried out by the controller.

FIG. 3 describes the process by which inputs from sensor module 102 are processed by controller 103. At step 301, controller 103 determines whether, based on a signal (or lack of a signal) from ignition monitor 207, the ignition is on or off. If the ignition is off, controller 103 determines whether, based on information from temperature monitor 206, an extreme temperature condition exists. If so, at step 303, controller 103 next determines whether a human or an animal is in the vehicle based on input from presence monitor 205. If a person or animal has been determined to be present in the vehicle, then, at step 304, the controller determines, from door-ajar status monitor 208, whether any doors of the vehicle have been opened or closed within a specified time. If all hazardous-condition criteria are satisfied, controller 103 determines that a hazardous condition is present at step 305 and sends a hazardous-condition signal 105 to alarm module 104.

Once a hazardous condition has been determined to be present, a button or switch in the vehicle (not shown) can be activated to temporarily disable the safety device 101 to allow the condition to be resolved and the device to be rearmed. This will ensure ample time for the variables of the hazardous condition to return to their normal state before the alarm module 104 can be re-activated to reduce the probability of a double trigger for a single hazardous situation. However, this period must not be longer than a half an hour to avoid missing a real hazardous situation.

Figure 4:
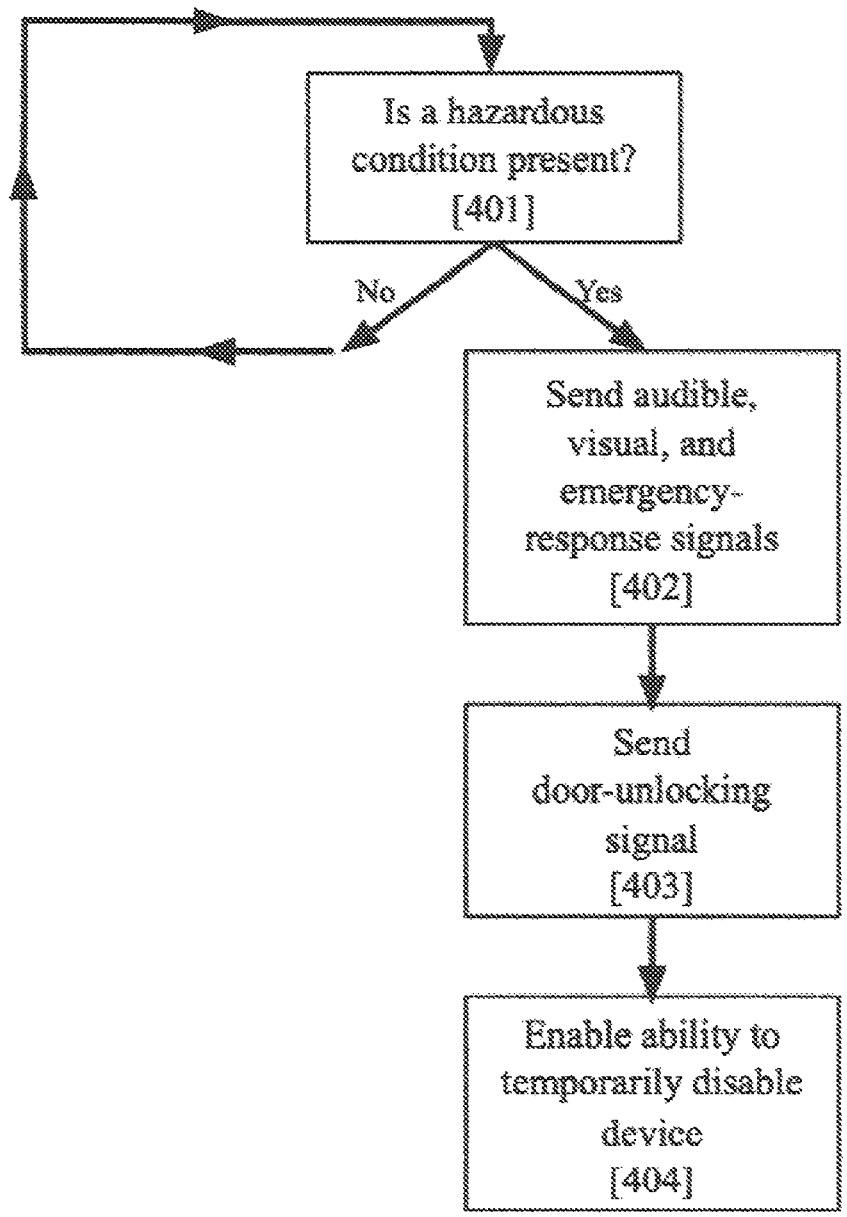
FIG. 4 is a flow diagram of the process carried out by the alarm monitor.

FIG. 4 describes an embodiment in which one or more signals may be sent from the alarm module. Once the hazardous-condition signal 105 is received by the alarm module 104, one or more of the audible, visual, or emergency-response signals are sent at step 402. A door-unlocking signal 204 may also be sent at step 403. In addition, at step 404, the device may be manually disabled for a predetermined time by activating a button or switch inside the vehicle to allow detected conditions to return to normal.

Figure 5:
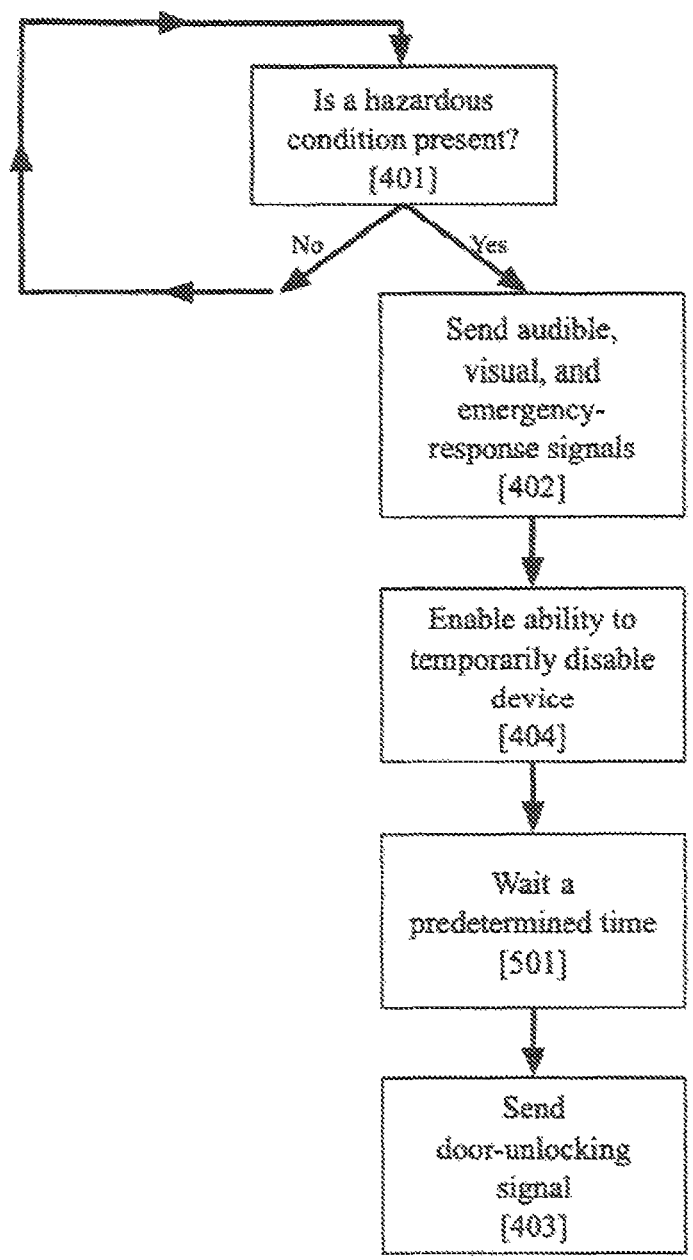
FIG. 5 is a flow diagram of an enhanced version of the process described in FIG. 4 to thwart intruders.

FIG. 5 shows an alternative process for generating alarm signals in a way that thwarts unwanted interference with the door-unlocking mechanism. The process described in FIG. 5 generally follows the flow of the process shown in FIG. 4 except that the alternative process interposes a delay at step 501 (after the audible, visual, and emergency-response signals are sent) before the door-unlocking signal is generated at step 403 to unlock the doors. This delay is designed to provide ample time for the audible, visual, and transmittable signals to attract enough attention to the vehicle before an unwanted intruder can open the unlocked doors.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the concept and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

The invention claimed is:
1. A safety device for a vehicle, comprising:
a presence monitor disposed in the interior of the vehicle for detecting a presence of a human or an animal in an interior of the vehicle;
a temperature monitor disposed in the interior of the vehicle for detecting temperature in the interior of the vehicle;
a controller coupled to the presence monitor, to the temperature monitor, and to an ignition system of the vehicle for generating a hazardous-condition signal in response to an extreme temperature condition in the vehicle when a human or animal is detected in the vehicle and the vehicle engine is not running; and
an alarm module connected to the controller for generating an audible alarm signal, a visual alarm signal and a wireless emergency-response signal in response to a hazardous-condition signal from the controller,
wherein the alarm module is configured to generate a door unlocking signal to unlock doors of the vehicle a redetermined time after the audible, visual, and emergency-response alarm signals have been sent.

2. The device of claim 1 wherein the presence monitor is a radar-based detection sensor.

3. The device of claim 1 wherein the presence monitor is a heartbeat detection sensor.

4. The device of claim 1 further comprising a door monitoring system disposed in the interior of the vehicle for detecting the opening of the vehicle doors.

5. The device of claim 1 further comprising a switch mounted in the interior of the vehicle for disabling the alarm module when the hazardous condition has been resolved.

* * * * *